May 17, 1960 J. H. STAAK 2,936,947
MOTOR MOUNTING ARRANGEMENT
Filed Nov. 27, 1956 2 Sheets-Sheet 1

Inventor:
Julius H. Staak,
by Robert G. [illegible]
His Attorney.

United States Patent Office 2,936,947
Patented May 17, 1960

2,936,947

MOTOR MOUNTING ARRANGEMENT

Julius H. Staak, Fort Wayne, Ind., assignor to General Electric Company, a corporation of New York Application November 27, 1956, Serial No. 624,551

4 Claims. (Cl. 230—117)

This invention relates to mounting arrangements, and more particularly to a construction for supporting an electric motor in operative relation to an air moving device.

Air moving apparatus of the blower type, which incorporates a rotatable radial-type fan member within a scroll shaped housing, is in widespread usage, particularly in the heating, air conditioning, and ventilating fields. Equipment of this type is normally operated by means of an electric motor which may either be mounted in direct driving relationship to the fan unit or, alternatively, may be mounted outside the unit and connected to drive it through suitable belt and pulley means or the like. Since the latter alternative requires extra space and equipment, the direct drive approach is gaining increasing usage. However, the presence of the motor in or adjacent the fan unit has been found to constitute a considerable barrier to the passage of air through the inlets to the unit, consequently decreasing the output of the blower apparatus. This is particularly true where, as is frequently the case, the motor is mounted directly at or in one of the inlet openings. Such a mounting has proved popular because of the great ease of securing the motor to one side of the blower housing when it is so positioned. There is, however, far less obstruction to the flow of air (and therefore a much smaller effect on the output of the blower) if the motor is mounted substantially within the fan unit so that it does not provide an obstruction directly at the inlet. While this construction provides a compact unit having a high output, the problem of mounting the motor has proved to be a major one: either expensive constructions had to be provided to avoid undue stress on the relatively weak thin sheet material of the blower housing, or else a highly specialized type of electric motor was required with a consequent increase in the cost of the unit.

It is therefore an object of the invention to provide a construction whereby an electric motor may be mounted within the fan unit of a blower so as to be in direct driving relationship therewith, providing a minimum of expense and a maximum of rigidity.

Another object is to provide a mounting structure which permits the use of a relatively standard motor in direct driving relationship to the fan unit of a blower as opposed to a highly specialized one.

In one aspect thereof, the invention provides a housing for air moving apparatus which has an inlet opening. An electric motor of the standard type having a housing, a stator within the housing, a rotor concentrically within the stator, and a shaft extending out of the motor housing at an axial end thereof, is also provided. A bearing is mounted about the motor shaft outside the motor housing so as to be in rotatably supporting relationship thereto, and means rigidly supporting the bearing are secured to the apparatus housing. At the other end of the motor, means rigidly secure the motor housing to the apparatus housing so that the two rigid means provide the motor with all the support necessary. A fan unit, which has a plurality of fan blades in the usual manner, is positioned within the apparatus housing about the motor; the motor shaft is secured to the fan unit by means which engage the shaft axially intermediate the bearing and the motor housing. There is thus no interference between the parts during operation of the blower. The extra bearing on the shaft of the motor and the arrangement whereby the motor is supported by its shaft at one end and by the motor housing at the other end permit the use of a standard motor. The motor is mounted in direct driving relationship with the fan unit, directly inside the unit, and without exercising undue stress on the blower housing.

The features of the invention which are believed to be novel are set forth with particularity in the appended claims. The invention itself, however, both as to its organization and method of operation together with further objects and advantages thereof, may best be understood by reference to the following description taken in connection with the accompanying drawings.

Figure 1:
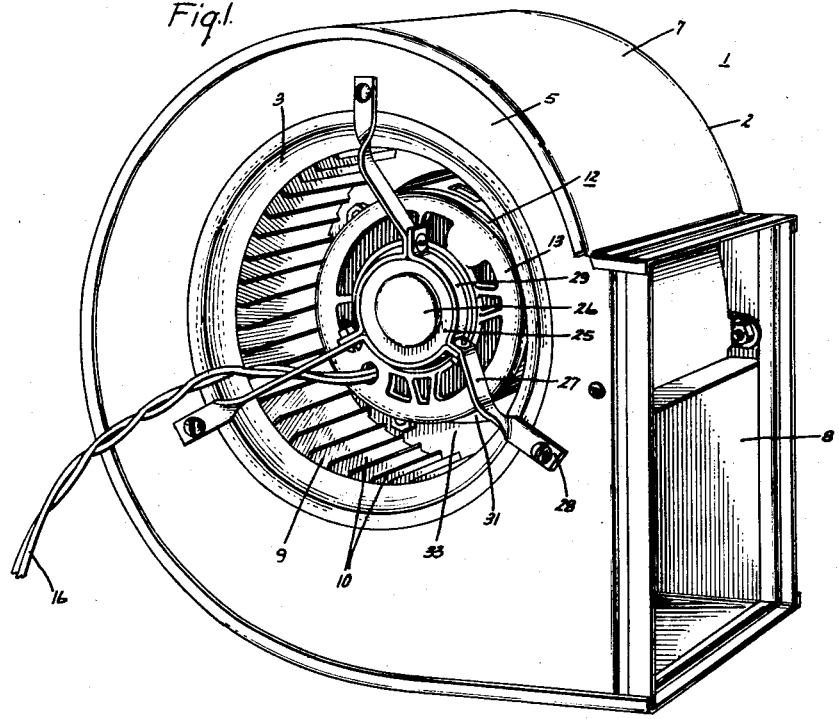
Figure 1 is a view in perspective of a blower incorporating the improved mounting arrangement of this invention.
Figure 2:
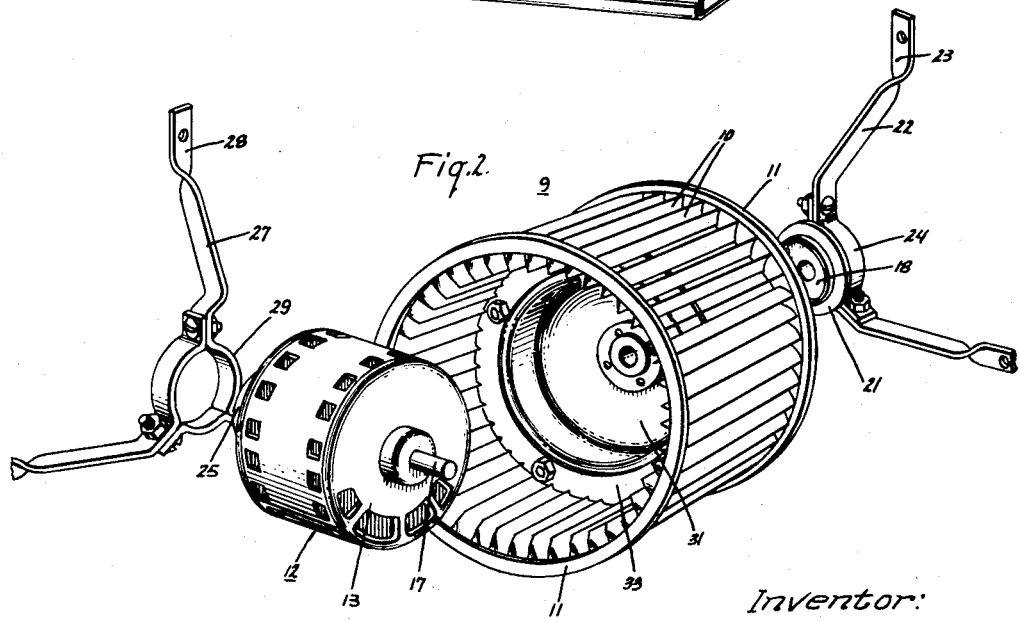
Figure 2 is an exploded view in perspective showing the elements of the improved mounting arrangement.
Figure 3:
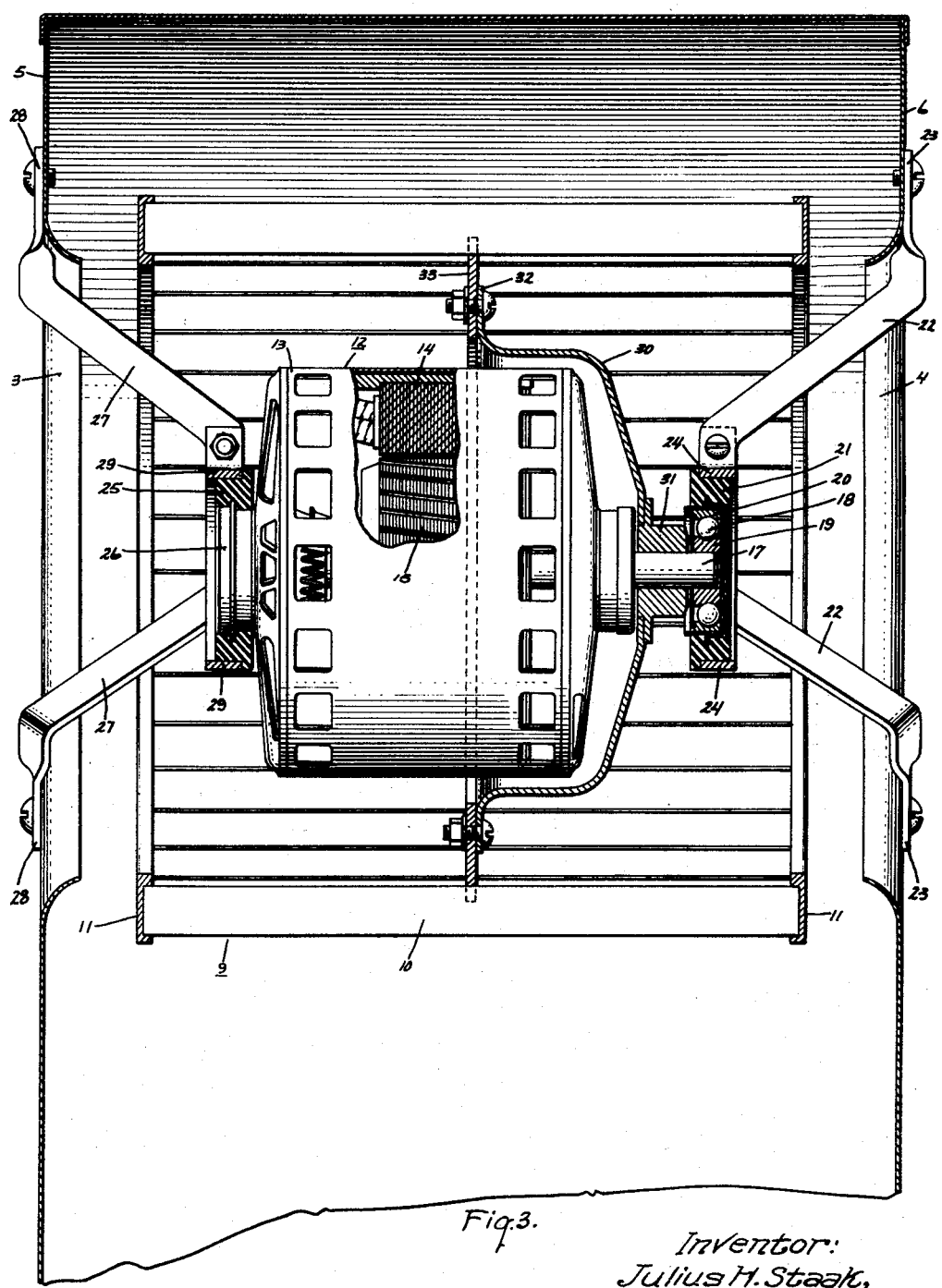
Figure 3 is a side view, partly in cross section, of the blower including the fan unit, the motor, and the mounting arrangement.

Referring now to the figures of the drawing, there is shown a blower device, generally indicated at 1, including a housing 2 normally formed from thin sheet metal. The housing has inlet openings 3 and 4 formed in opposite sides 5 and 6 respectively, and includes an outer sheet 7 which is formed as a scroll in the usual manner; sheet 7 cooperates with side sheets 5 and 6 to form outlet 8. A substantially cylindrical fan unit 9 is positioned within housing 2 so as to be substantially in axial alignment with the openings 3 and 4. Fan unit 9 is formed, in the usual manner, with a plurality of axially extending fan blades 10 secured together at their ends by annular members 11. In order to drive the fan unit 9, an electric motor 12 of a standard type having a housing 13, a stator 14 secured within the housing and a rotor 15 concentrically positioned within the stator 14 is provided. Upon application of electric power to the motor through conductors 16, rotor 15 is caused to rotate shaft 17 which is secured thereto and extends from one axial end of the motor.

A bearing 18 is positioned about shaft 17 outside and adjacent housing 13 with its inner race 19 secured to rotate with shaft 17, and its outer race 20 rigidly secured within a resilient annulus 21 which provides a mounting for motor 12. While an antifriction type bearing such as illustrated is preferred, it will be understood that the invention is not so limited. Brackets 22 are secured at their outer ends 23 to side 6 of housing 1 and at their inner ends 24 about the resilient mounting ring 21 to fasten the motor to side 6. A similar type of annulus 25 is provided about hub 26 of motor housing 13 at the other axial end of the motor 12 from shaft 17 and bearing 18. Bracket members 27 have their outer ends 28 secured to side 5 of housing 2 and their inner ends 29 secured about ring 25 in similar fashion to the arrangement of the brackets 22 with respect to side 6 and mounting ring 21. A cup-like member 30 has a hub portion 31 rigidly secured to shaft 17 axially between motor housing 13 and bearing 18; member 30 extends radially outwardly, and its outer end 32 is secured by any preferred means to a member 33 which in turn is secured to the fan blades 10, providing a direct driving relationship between shaft 17 and fan unit 9. As shown, member 30 is preferably formed to be cupped about part of motor housing 13. With this construction, fan blades 10 are secured substantially centrally of their axial length when motor 12 is positioned entirely within fan unit 9.

It will be observed that the combination of the support about hub 26 at one end of the motor and about bearing 18 at the other end of the motor allows simple commonly used brackets to be used to mount the motor rigidly to the blower housing 1 without undue strain on the relatively weak parts of which the blower housing is made. Also, a direct driving relationship is provided to the blower from a standard type motor having the stator concentrically outside the rotor and the driving shaft. It will further be observed that the construction permits the motor to be mounted completely within the fan unit 9 so as to leave the inlets relatively unobstructed and improve the performance of the blower.

While the invention has been explained by describing a particular embodiment thereof, it will be apparent that improvements and modifications may be made without departing from the scope of the invention as defined in the appended claims.

What I claim as new and desire to secure by Letters Patent of the United States is:

1. Air moving apparatus comprising a housing having a plurality of confronting inlet openings, an electric motor having a housing, a stator secured within said motor housing, a rotor concentrically and rotatably positioned within said stator, a shaft secured to said rotor extending out of said motor housing at an axial end thereof, a bearing mounted about said shaft outside said motor housing in rotatably supporting relation thereto, a first motor mounting means rigidly supporting said bearing secured to said apparatus housing, a second motor mounting means securing the end of said motor housing opposite said shaft to said apparatus housing and rigidly affixed to said apparatus housing, a fan unit having a plurality of fan blades positioned about and extending axially beyond the ends of said motor in said apparatus housing in substantially axially alignment with said inlet openings, and means securing said shaft to said fan unit positioned axially intermediate said bearing and said motor housing and comprising substantially the sole support of said fan unit on said motor, said first and second motor mounting means being directed toward each other and having their inner ends arranged for mounting both said bearing and said end of said motor housing inwardly of said fan unit thereby to provide a compact, firmly mounted assembly having a substantially unobstructed space for flow of air inwardly through said inlet openings.

2. A blower housing having a pair of confronting inlet openings respectively formed in the sides thereof, an electric motor having a housing, a stator secured within said motor housing, a rotor concentrically and rotatably positioned within said stator, a shaft secured to said rotor extending out of said motor housing at an axial end thereof, a bearing mounted about said shaft outside said motor housing in rotatably supporting relation thereto, a first motor mounting means rigidly supporting said bearing secured to said blower housing, a second motor mounting means securing the end of said motor housing opposite said shaft to said blower housing and rigidly affixed to said blower housing, a substantially cylindrical fan unit having a plurality of axially extending fan blades positioned about and extending axially beyond the ends of said motor in said blower housing in substantial axial alignment with said inlet openings, and means securing said shaft to said fan unit positioned axially intermediate said bearing and said motor housing and comprising substantially the sole support of said fan unit on said motor, said first and second motor mounting means being directed toward each other and having their inner ends arranged for mounting both said bearing and said end of said motor housing inwardly of said fan unit thereby to provide a compact, firmly mounted assembly having a substantially unobstructed space for flow of air inwardly through said inlet openings.

3. A scroll-shaped blower housing having its two sides with confronting inlet openings respectively formed therein, an electric motor having a housing, a stator secured within said housing, a rotor concentrically and rotatably positioned within said stator, a shaft secured to said rotor extending out of said motor housing at an axial end thereof, a hub formed on said motor housing at the other end from said shaft, a bearing mounted outside said motor housing about said shaft in rotatably supporting relation thereto, a first motor mounting means rigidly supporting said bearing secured to one side of said blower housing, a second motor mounting means securing said hub to the other side of said blower housing and rigidly affixed to said blower housing, a substantially cylindrical fan unit having a plurality of axially extending fan blades positioned about and extending axially beyond the ends of said motor in said blower housing in substantially axial alignment with said openings, and means securing said shaft to said fan unit positioned axially intermediate said bearing and said motor housing and comprising substantially the sole support of said fan unit on said motor, said first and second motor mounting means being directed toward each other and having their inner ends arranged for mounting both said bearing and said hub inwardly of said fan unit thereby to provide a compact, firmly mounted assembly having a substantially unobstructed space for flow of air inwardly through said inlet openings.

4. A scroll-shaped blower housing having its two sides with confronting inlet openings respectively formed therein, an electric motor substantially axially aligned with said inlet openings positioned within said blower housing, said motor having a housing, a stator secured within said motor housing, a rotor concentrically and rotatably positioned within said stator, a shaft secured to said rotor extending out of said motor housing at an axial end thereof, an anti-friction type bearing mounted outside said motor housing about said shaft in rotatably supporting relation thereto, bracket means secured at one end to a side of said blower housing and at the other end to said bearing, second bracket means secured at one end thereof to the other side of said blower housing and at the other end thereof to the end of said motor housing which is opposite said shaft, a substantially cylindrical fan unit having a plurality of substantially axially extending fan blades positioned about and extending axially beyond the ends of said motor in said blower housing, and means securing said shaft to said fan unit intermediate said two bracket means and comprising substantially the sole support of said fan unit on said motor, said first and second mentioned bracket means being directed toward each other and having their inner ends arranged for mounting both said bearing and said end of said motor housing inwardly of said fan unit thereby to provide a compact, firmly mounted assembly having a substantially unobstructed space for flow of air inwardly through said inlet openings.

References Cited in the file of this patent

UNITED STATES PATENTS

| 1,677,433 | Daun | July 17, 1928 |
| 2,068,347 | Myers | Jan. 19, 1937 |
| 2,297,049 | Cotton et al. | Sept. 29, 1942 |
| 2,297,050 | Cotton et al. | Sept. 29, 1942 |
| 2,316,608 | McMahan | Apr. 13, 1943 |
| 2,661,894 | Stevenson et al. | Dec. 8, 1953 |
| 2,686,630 | Burrows | Aug. 17, 1954 |
| 2,776,088 | Wentling | Jan. 1, 1957 |
| 2,798,659 | Tweedy | July 9, 1957 |

FOREIGN PATENTS

| 15,659 | Great Britain | of 1909 |